US012074774B2

(12) United States Patent
Savov et al.

(10) Patent No.: US 12,074,774 B2
(45) Date of Patent: Aug. 27, 2024

(54) METHODS, SYSTEMS, AND APPARATUS TO SCALE IN AND/OR SCALE OUT RESOURCES MANAGED BY A CLOUD AUTOMATION SYSTEM

(71) Applicant: VMware LLC, Palo Alto, CA (US)

(72) Inventors: Boris Savov, Sofia (BG); George P. Dimitrov, Sofia (BG); Ventsyslav Raikov, Sofia (BG); Kristiyan Georgiev, Sofia (BG)

(73) Assignee: VMware LLC, Palo Alto, CA (US)

( * ) Notice: Subject to any disclaimer, the term of this patent is extended or adjusted under 35 U.S.C. 154(b) by 191 days.

(21) Appl. No.: 17/316,495

(22) Filed: May 10, 2021

(65) Prior Publication Data
US 2021/0266237 A1 Aug. 26, 2021

Related U.S. Application Data

(63) Continuation of application No. 15/617,753, filed on Jun. 8, 2017, now Pat. No. 11,005,733.

(51) Int. Cl.
*H04L 41/5051* (2022.01)
*G06F 16/901* (2019.01)
(Continued)

(52) U.S. Cl.
CPC ...... *H04L 41/5051* (2013.01); *H04L 41/0896* (2013.01); *H04L 41/5054* (2013.01); *G06F 16/9024* (2019.01); *H04L 41/5096* (2013.01)

(58) Field of Classification Search
CPC ............ H04L 41/5051; H04L 41/0896; G06F 16/901
See application file for complete search history.

(56) References Cited

U.S. PATENT DOCUMENTS 8,065,676 B1 11/2011 Sahai et al.
8,261,295 B1 9/2012 Risbood et al.
(Continued)

OTHER PUBLICATIONS

Mohindra et al. "Dynamic Scaling of Web Applications in a Virtualized Cloud Computing Environment," In e-Business Engineering, Oct. 2009, ICEBE'09. IEEE International Conference on (pp. 281-286), IEEE, (7 pages).
(Continued)

*Primary Examiner* — Clayton R Williams
(74) *Attorney, Agent, or Firm* — Quarles & Brady LLP

(57) ABSTRACT

Methods and apparatus to scale in and/or scale out arbitrary resources managed by a cloud automation system are disclosed. An example apparatus includes processor circuitry; and a non-transitory computer readable medium comprising instructions which, when executed, cause the processor circuitry to: in response to an indication to scale a first component of an application to be deployed: determine an execution plan to scale the first component based on a dependency graph corresponding to a dependency within a blueprint specifying a logical topology of the application; perform a custom action to scale the first component, the custom action identified in a scaling parameter associated with the application; and update operation of a second component based on scaling the first component, the second component dependent on the first component, the update to enable the second component to interact with the first component after the scaling.

20 Claims, 10 Drawing Sheets

(51) Int. Cl.
*H04L 41/0896* (2022.01)
*H04L 41/50* (2022.01)
*H04L 41/5054* (2022.01)

(56) References Cited

U.S. PATENT DOCUMENTS

| | | | |
|---|---|---|---|
| 8,572,612 B2 | 10/2013 | Kern | |
| 9,208,007 B2 | 12/2015 | Harper et al. | |
| 9,361,092 B1* | 6/2016 | Bai | G06F 9/44505 |
| 9,424,065 B2 | 8/2016 | Singh et al. | |
| 9,535,734 B2* | 1/2017 | Cao | G06F 9/4856 |
| 10,275,270 B2 | 4/2019 | Singh et al. | |
| 2009/0210875 A1 | 8/2009 | Bolles et al. | |
| 2010/0100880 A1 | 4/2010 | Shigeta et al. | |
| 2012/0101998 A1* | 4/2012 | Cahill | G06F 16/2329 707/654 |
| 2012/0123825 A1 | 5/2012 | Biran et al. | |
| 2013/0232463 A1 | 9/2013 | Nagaraja et al. | |
| 2013/0232497 A1 | 9/2013 | Jalagam et al. | |
| 2013/0232498 A1 | 9/2013 | Mangtani et al. | |
| 2014/0058871 A1 | 2/2014 | Marr et al. | |
| 2014/0280961 A1 | 9/2014 | Martinez et al. | |
| 2014/0380308 A1 | 12/2014 | Hassine et al. | |
| 2015/0074679 A1 | 3/2015 | Fenoglio et al. | |
| 2015/0089064 A1 | 3/2015 | Salle et al. | |
| 2015/0106807 A1* | 4/2015 | Reddy | G06F 9/5077 718/1 |
| 2015/0378716 A1 | 12/2015 | Singh et al. | |
| 2015/0378765 A1 | 12/2015 | Singh et al. | |
| 2016/0147556 A1 | 5/2016 | Hu et al. | |
| 2016/0357589 A1 | 12/2016 | Singh et al. | |
| 2016/0358367 A1* | 12/2016 | Metz | G06F 40/14 |
| 2016/0378525 A1* | 12/2016 | Bjorkengren | G06F 9/45558 718/1 |
| 2018/0359162 A1 | 12/2018 | Savov et al. | |

OTHER PUBLICATIONS

Vaquero et al. "Dynamically Scaling Applications in the Cloud." ACM SIGCOMM Computer Communication Review 41.1 (Jan. 2011), pp. 45-52 (8 pages).

Espadas et al. "A tenant-based resource allocation model for scaling Software-as-a-Service applications over cloud computing infrastructures." Future Generation Computer Systems 29.1 (Jan. 2013), pp. 273-286 (14 pages).

United States Patent and Trademark Office, "Non-Final Office Action", issued in connection with U.S. Appl. No. 14/453,701, filed Oct. 2, 2015, (14 pages).

United States Patent and Trademark Office, "Final Office Action", issued in connection with U.S. Appl. No. 14/453,701, filed Feb. 19, 2016, (18 pages).

United States Patent and Trademark Office, "Notice of Allowance", issued in connection with U.S. Appl. No. 14/453,701, filed Apr. 26, 2016, (28 pages).

United States Patent and Trademark Office, "Non-Final Office Action", issued in connection with U.S. Appl. No. 15/198,849, filed Mar. 22, 2018, (16 pages).

United States Patent and Trademark Office, "Final Office Action", issued in connection with U.S. Appl. No. 15/198,849, filed Aug. 7, 2018, (17 pages).

United States Patent and Trademark Office, "Notice of Allowance", issued in connection with U.S. Appl. No. 15/198,849, filed Dec. 13, 2018, (9 pages).

Shiraz, Muhammad, et al. "A study on virtual machine deployment for application outsourcing in mobile cloud computing." The Journal of Supercomputing 63.3 (2013): pp. 946-964, published online: Dec. 18, 2012 (19 pages).

Razavi, Kaveh, and Thilo Kielmann. "Scalable virtual machine deployment using VM image caches." Proceedings of the International Conference on High Performance Computing, Networking, Storage and Analysis. ACM, Nov. 17-21, 2013. pp. 1-12 (12 pages).

Chen, Wei, et al. "A profit-aware virtual machine deployment optimization framework for cloud platform providers." Cloud Computing (CLOUD), 2012 IEEE 5th International Conference on. IEEE, Jun. 24-29, 2012. pp. 17-24 (8 pages).

United States Patent and Trademark Office, "Final Office Action", issued in connection with U.S. Appl. No. 15/617,753, filed Dec. 17, 2019, (14 pages).

United States Patent and Trademark Office, "Non-Final Office Action", issued in connection with U.S. Appl. No. 15/617,753, filed May 28, 2019, (14 pages).

United States Patent and Trademark Office, "Advisory Action", issued in connection with U.S. Appl. No. 15/617,753, filed Mar. 27, 2020, (3 pages).

United States Patent and Trademark Office, "Non-Final Office Action", issued in connection with U.S. Appl. No. 15/617,753, filed Jun. 11, 2020, (15 pages).

United States Patent and Trademark Office, "Notice of Allowance", issued in connection with U.S. Appl. No. 15/617,753, filed Jan. 7, 2021, (8 pages).

United States Patent and Trademark Office, "Corrected Notice of Allowance", issued in connection with U.S. Appl. No. 15/617,753, filed Apr. 12, 2021, (1 pages).

* cited by examiner

METHODS, SYSTEMS, AND APPARATUS TO SCALE IN AND/OR SCALE OUT RESOURCES MANAGED BY A CLOUD AUTOMATION SYSTEM

RELATED APPLICATION

This patent arises from a continuation of U.S. patent application Ser. No. 15/617,753 (Now U.S. Pat. No. 11,005,733), which was filed on Jun. 8, 2017. U.S. patent application Ser. No. 15/617,753 is hereby incorporated herein by reference in its entirety. Priority to U.S. patent application Ser. No. 15/617,753 is hereby claimed.

FIELD OF THE DISCLOSURE

The present disclosure relates generally to cloud computing and, more particularly, to methods and apparatus to scale in and/or scale out resources managed by a cloud automation system.

BACKGROUND

Virtualizing computer systems provide benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

DETAILED DESCRIPTION

Figure 1:
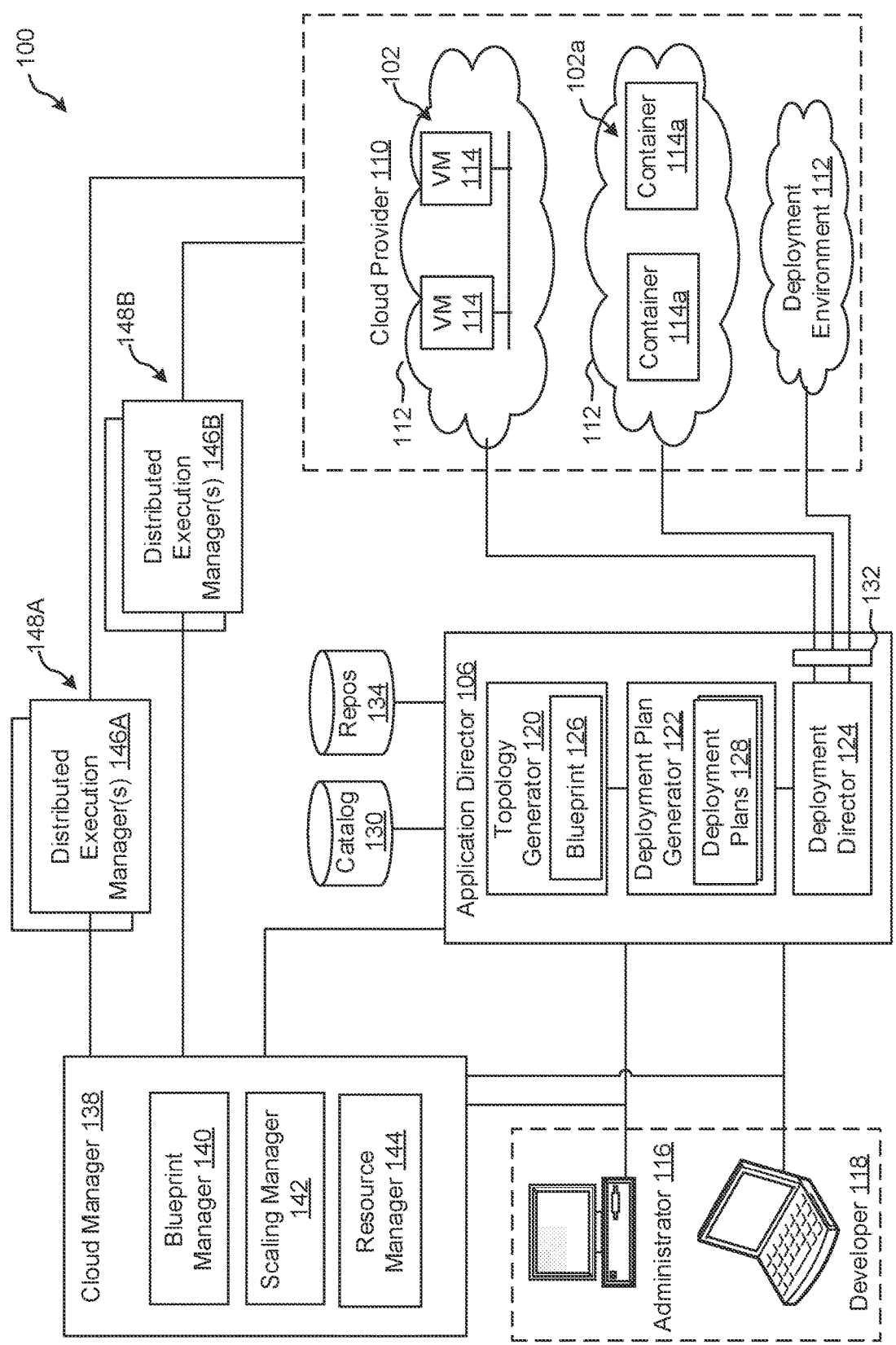
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Examples disclosed herein facilitate the scaling in and/or scaling out of cloud and/or virtualized platform resources managed by a cloud automation system, thereby providing a more customizable cloud/virtual environment for an end user or customer. When a designer (e.g., a user) designs a cloud/virtual system, the designer may not know how many resources to allocate for particular services and/or the amount of resources needed for a particular service may change with time (e.g., load changes). Scaling may be used to increase and/or decrease the resources at any time. For example, after a cloud system has been deployed, the designer may allocate one virtual machine for operation and, because the virtual machine may not be enough to operate under the total load of the system, the designer may utilize a scalable virtual machine. In such an example, the virtual machine may be scaled out to two or more virtual machines based on certain parameters and/or may be scaled in to a less amount of virtual machines based on certain parameters. Examples disclosed herein facilitate the scaling in and/or scaling out of any resource in the cloud/virtualized environment.

Examples disclosed herein provide a designer with an interface to select component and/or resources within a cloud/virtual environment to be scalable. Additionally, the designer may, via the user interface, allocate space for the scaling out of the resource/component and may select the parameters corresponding to a scale out or scale in operation. Such scalable components may include virtual machines, servers, databases, service providers, orchestrators, hypervisors, and/or any other component in a cloud/virtual environment that may be scaled in or out. Because such scalable components operate in conjunction with dependent components/resources and/or configuration tasks, examples disclosed herein further include updating such dependent components/resources and/or configuration tasks to properly operate after a scaling (e.g., dispatch requests and/or otherwise communicate with the scaled components). Such dependent components/resources may include load balancers, cloud/virtual environment managers, proxies, and/or any other resource that depends on a scalable component.

FIG. 1 depicts an example system 100 constructed in accordance with the teachings of this disclosure for managing a cloud/virtual computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other program(s), software, device(s), etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc. In some examples, the administrator 116, the developer 118, other programs, and/or other devices may define application components and/or any resource as scalable. A scalable component/resource is a component/resource that may be expanded into additional components/resources and/or contracted into less component/resources (e.g., for balancing loads or managing cloud systems). For example, VM 114, containers 114a, and/or any other part or subsection (e.g., including, but not limited to, resources, services, databases, servers, appliances, business logic components, analytic components, hypervisors, etc.) of the example cloud provider 110 may defined as scalable. In such examples, the administrator 116, the developer 118, other programs, and/or other devices define the parameters of the scalable components, including provision/register locations in unprovisioned space for a scale out operation, custom actions/configurations for scale out/scale in, custom actions for dependent components (e.g., management systems, load balancing systems, proxies, etc.) during a scale out/scale in, etc. A dependent component is a component that operates in conjunction with a scalable component. For example, a dependent component may communicate with, interact with, manage, monitor, and/or otherwise interface with a scalable component. In some examples, when the VM 114 is a scalable component, a dependent component may be a load balancer (e.g., the load balancer 310 of FIG. 1). A load balancer assigns tasks and/or manages access to the plurality of VMs 114. Accordingly, if a VM 114 is scaled out to two or more VMs or two or more VMs 114 are scaled in to on VM, the load balancer needs to be updated to be able to assign tasks and/or manage access to the scaled out or scaled in VMs 114. For example, updating the load balancer may include updating an IP table corresponding to the scalable VMs, performing cleanup tasks, reconfiguring the load balancer, etc. In some examples, a virtual network switch may be modeled in a blueprint. In such an example, on-demand add/remove operation of ports may be utilized to attach one or more VMs to the network.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources, as well as which computing resources are scalable and the characteristics of such scalable components. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, scale in, scale out, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scaled in/scaled out) the deployment. Additionally, the deployment director 124 may provide a load balancer (e.g., the load balancer 310 of FIG. 3) and/or any other scale in/scale out dependent component with a series of tasks specific to a custom action related to updating component operations corresponding to the scaling.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints, a scaling manager 142 to determining when to update the scalable resources of the multi-machine blueprints to include additional or fewer resources, and a resource manager 144 to reclaim unused cloud resources and determine the load and/or cloud resources available in the deployment environment 112. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows.

According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The example scaling manager 142 of FIG. 1 facilitates a scale in and/or scale out of resources in the example cloud provider 110 based on instructions from the administrator 116, the developer 118, and/or any other device capable of transmitting instructions corresponding to a scale in/scale out. For example, a designer may select a component to be scalable (e.g., to expand the component into multiple components when a load corresponding to the component is high and/or to reduce the multiple components into less components when the load corresponding to the multiple components are low). In such an example, the scaling manager 142 may identify the parameters corresponding to the scaling of the component. For example, the scaling manager 142 may determine when to trigger a scale-out (e.g., based on a load increase above a threshold level, etc.), when to trigger a scale-in (e.g., based on a load decrease below a threshold level, etc.), the resources necessary to scale out (e.g., space to provision/register during a scale out operation, etc.), custom instructions related to the scaling, any updates to components that depend on the scalable component (e.g., updating the IP table and/or performing cleanup logic, etc.), and/or which space to provision/register during a scale in operation. Example resources that may be scaled in and/or scaled out may include the example virtual machines 114, the example containers 114a, component servers, databases, service providers, orchestrators, event brokers, authentication providers, user profiles, business logic components, analytic components, etc. The example scaling manager 142 facilitates scale in/scale out by determining an execution plan by calculating a dependency graph. The dependency graph corresponds to the dependency of components within the blueprints, thereby allowing the scaling manager 142 to determine an optimal execution plan for scale in/scale out. For example, a load balancer may be balancing the load between four virtual machines, a first VM (VM1) being a scalable core application layer (tier 1), a second VM (VM2) being a scalable business layer (tier 2), a third VM (VM3) being a scalable web server (tier 3), and a fourth VM (VM4) being a non-scalable persistency layer (e.g., a database such as MS SQL, Oracle, MySQL, etc.). In such an example, a dependency graph corresponds to a provisioning order of VM1, VM2, VM3, VM4, and LB (e.g., either provisioned or configured depending on the LB type, virtual or physical). Accordingly, when a VM1 is scaled, VM2, VM3, and LB (e.g., the higher tiers) will be updated and when VM3 is scaled, LB will be updated (e.g., the higher tier). In another example, VM2 may be a user in an active directory. In such an example, the scaling manager 142 may register the new user in the active directory corresponding to each VM.

Once the execution plan is determined, the scaling manager 142 of FIG. 1 determines which application components are scalable from the execution plan. When a new application component (e.g., the VMs 114, the containers 114a, the vAs 320-324, the servers, 210A-210C of FIG. 2, the component servers 330-336 of FIG. 3, the service provider 410, the orchestrator 420, the event broker 430, the authentication provider 440, the database server 460 of FIG. 4, etc.) is created, the designer specifies (e.g., the administrator 116 and/or the developer 118) whether the component is scalable or not. If the designer determines that the application component is to be scalable, the designer can define how to provision/register space for a scale out operation, any custom actions/configurations related to scale in/scale out, and/or which components (e.g., dependent resource/configuration tasks) need to be updated based on the scale in/scale out of the scalable components. Accordingly, during scale in/scale out, the scaling manager 142 applies custom actions for scalable components to facilitate the scaling and runs custom update component operations for dependent resource/configuration tasks. In this manner, the scaling manager 142 is able to scale in/scale out scalable resources (e.g., any resource identified as scalable) and update any dependent (e.g., load balancer(s), cloud manager(s), proxies, etc.) at any time, including after deployment of the cloud platform 110. The designer may transmit instructions related to which components are to be scalable and the parameters corresponding go the scaling at any time, including after the application 102, 102a has been deployed. In some examples, the example scaling manager 142 transmits instructions to the example blueprint manager 140 corresponding to the scaling of the scalable components when scaling is triggered. In such examples, the blueprint managers 140 facilitates the scaling in the example cloud provider platform 110. The scaling manager 142 is further described below in conjunction with FIGS. 2 and 5.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure. In some examples, the resource manager 144 may determine when the load of the deployment environment 112 is low and/or if the available resources of in the deployment environment 112 are low based on the scaling parameters identified by a designer. In such examples, the resource manager 114 may transmit instructions corresponding to the resource and/or load to the example scaling manager 142, so that the scaling manager 142 can determine whether to scale scalable component in response to the load/resource level.

Although examples disclosed herein describe scaling components in the example cloud platform provider 110 of FIG. 1, components may be scaled in any platform environment. For example, a scaling operation may be performed in a virtualized workload domain that includes one or more hypervisors, including a context engine, services, libraries, a load balancer, etc. The one or more hypervisors may communicate with a virtual infrastructure server and a network virtualization manager, for example. Accordingly, an installation of such a virtualized workload domain can include one or more workload domains, where each workload domain includes a virtual infrastructure server, a network virtualization manager, and/or one or more hypervisors. In such an installation, the one or more components may be designed to be scalable (e.g., by a designer) and the virtual infrastructure and/or network virtualization managers may be dependents that would be updated based on the scaling of the one or more components.

Figure 2:
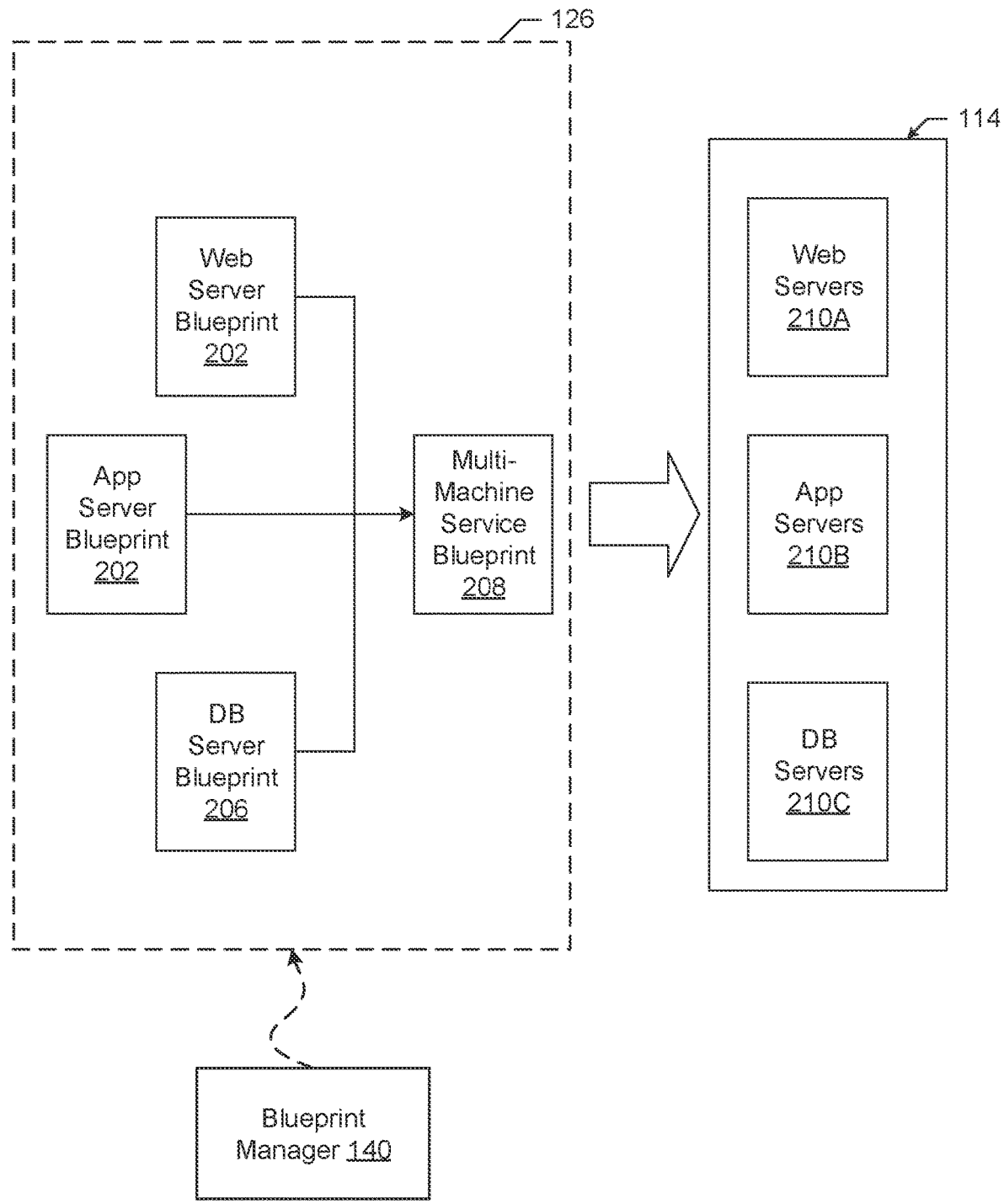
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3:
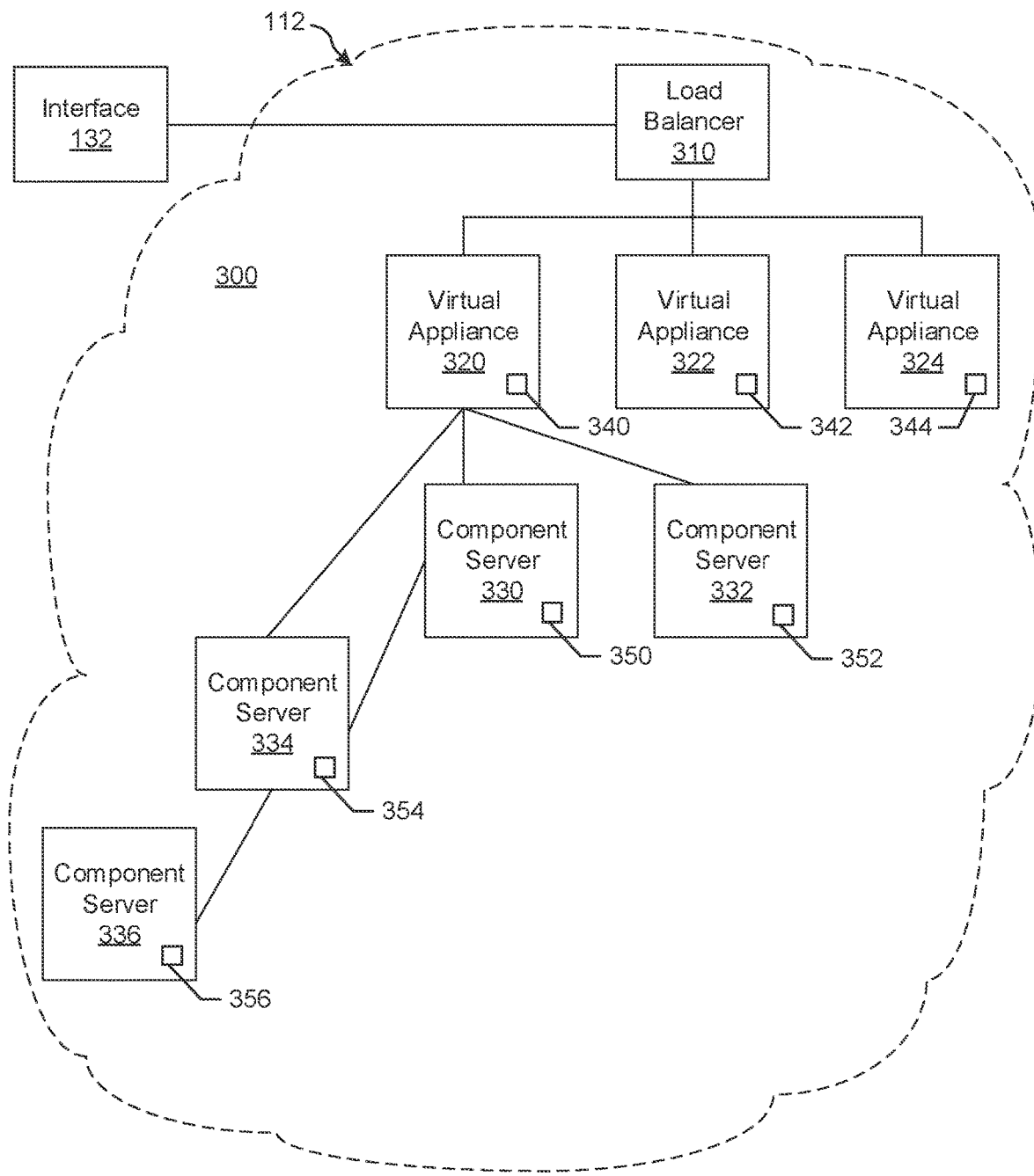
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example. In some examples, the LB 310 receives instructions from the scaling manager 142 and/or the example blueprint manager 140 (e.g., after being generated by the scaling manager 142, etc.) to perform custom update component operation(s) to update operation based on a scaled (e.g., scaled in and/or scaled out) component of the example installation 300 (e.g., one or more of the example virtual applicants 320-324, the example component servers 330-336, a portion of the example virtual applicant 320-324 and/or the example component server 330-336, business logic components, analytic components, and/or any other scalable component). In such examples, the LB 310 may, based on the instructions, update by running the received custom update operations to be able to operate in conjunction with the scaled in and/or scaled out application components.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336. One or more of and/or part(s) of one or more the example virtual appliances 320-324 and/or the example component servers 330-336 may be scalable based on the preferences and customizations of a designer (e.g., the administrator 116 and/or the developer 118 of FIG. 1). Additionally, any one of the example management endpoint(s) 340, 342, 344 and/or the example management agents 350-356 may be upgraded (e.g., based on a custom update component operation via the example blueprint manager 140) to operate after/during the scale in and/or scale out of a scalable component.

In certain examples, a graphical user interface associated with a front end of the load balancer 310 (e.g., a physical load balancer) guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
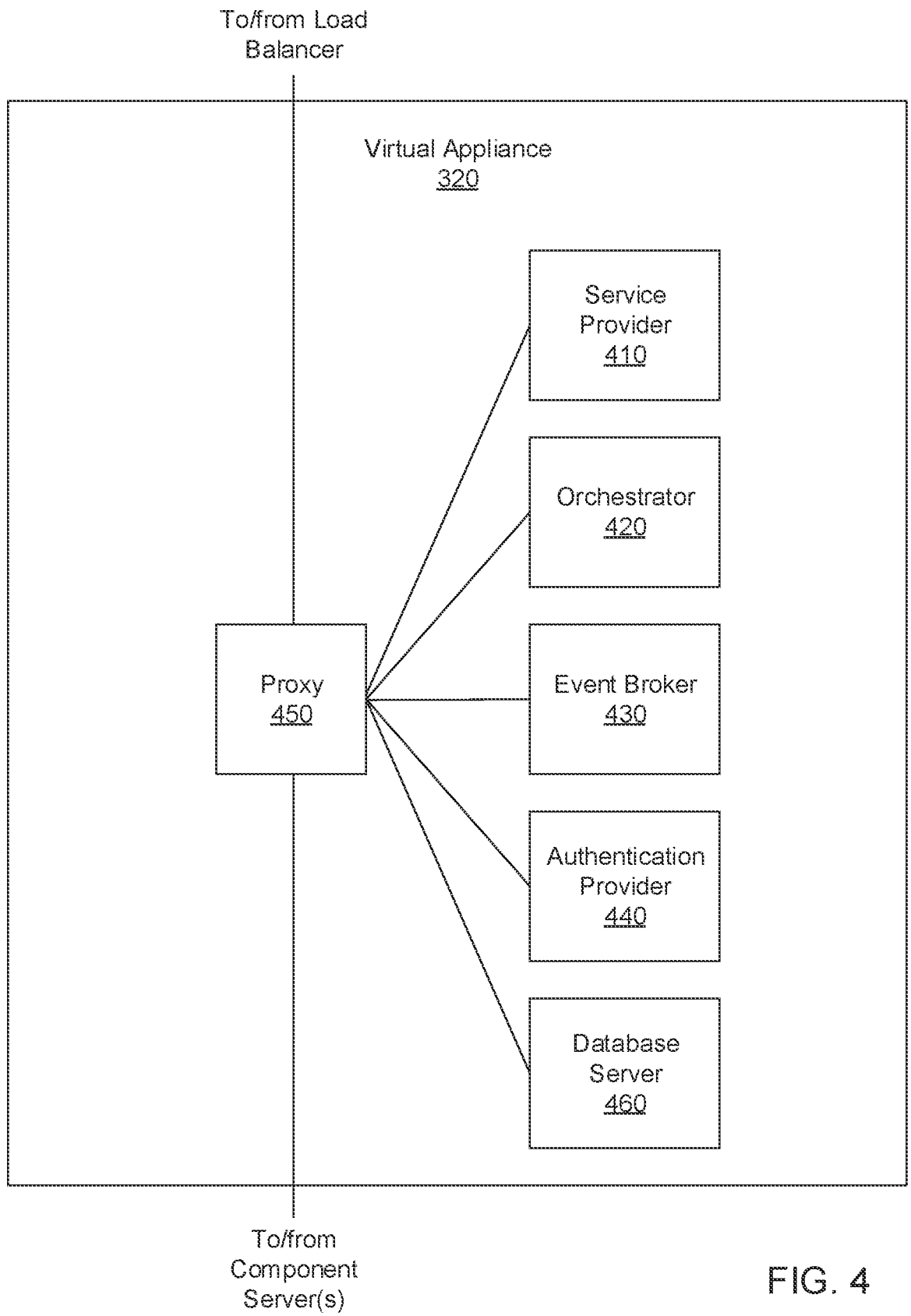
FIG. 4 illustrates an example implementation of a virtual appliance.

FIG. 4 illustrates an example implementation of the vA 320. In the example of FIG. 4, the vA 320 includes a service provider 410, an orchestrator 420, an event broker 430, an authentication provider 440, an internal reverse proxy 450 (e.g., herein referred to as proxy), and a database 460. The components 410, 420, 430, 440, 450, 460 of the vA 320 may be implemented by one or more of the VMs 114. The example service provider 410 provides services to provision interfaces (e.g., Web interface, application interface, etc.) for the vA 320. The example orchestrator (e.g., VRealize Orchestrator vRO)) 420 is an embedded or internal orchestrator that can leverage a provisioning manager, such as the application director 106 and/or cloud manager 138, to provision VM services but is embedded in the vA 320. For example, the vRO 420 can be used to invoke a blueprint to provision a manager for services.

The example service provider 410, the example orchestrator 420, the example event broker 430, and/or the example authentication provider 440 of FIG. 4 generate services including catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 of FIG. 4 provides a mechanism to handle tasks which are transferred between services with the orchestrator 420. The example event broker 430 may be an event drive extendibility engine that provides user interface driven option for lifecycle automation. The event broker 430 may complete coverage of IaaS machine life cycle, approve policy with external system, and notify external systems to configuration changes. The example authentication provider 440 (e.g., VMware Horizon™ services, VMware Identity Manager Documentation services, etc.) is a web based authentication server that authenticates and/or authorizes access to services and data (e.g., by providing web tokens for users to authenticate and/or authorize vRA services), for example. One or more of the example service provider 410, the example orchestrator 420, the example event broker 430, the example authentication provider 440, and/or the example database server 460 may be scalable based on the preferences and customizations of a designer (e.g., the example administrator 116 and/or the example developer 118).

The components of the vA 320 of FIG. 4 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users. The example proxy 450 may be upgraded (e.g., based on a custom update component operation via the example blueprint manager 140) to operate after/during the scale in and/or scale out of a scalable component.

Figure 5:
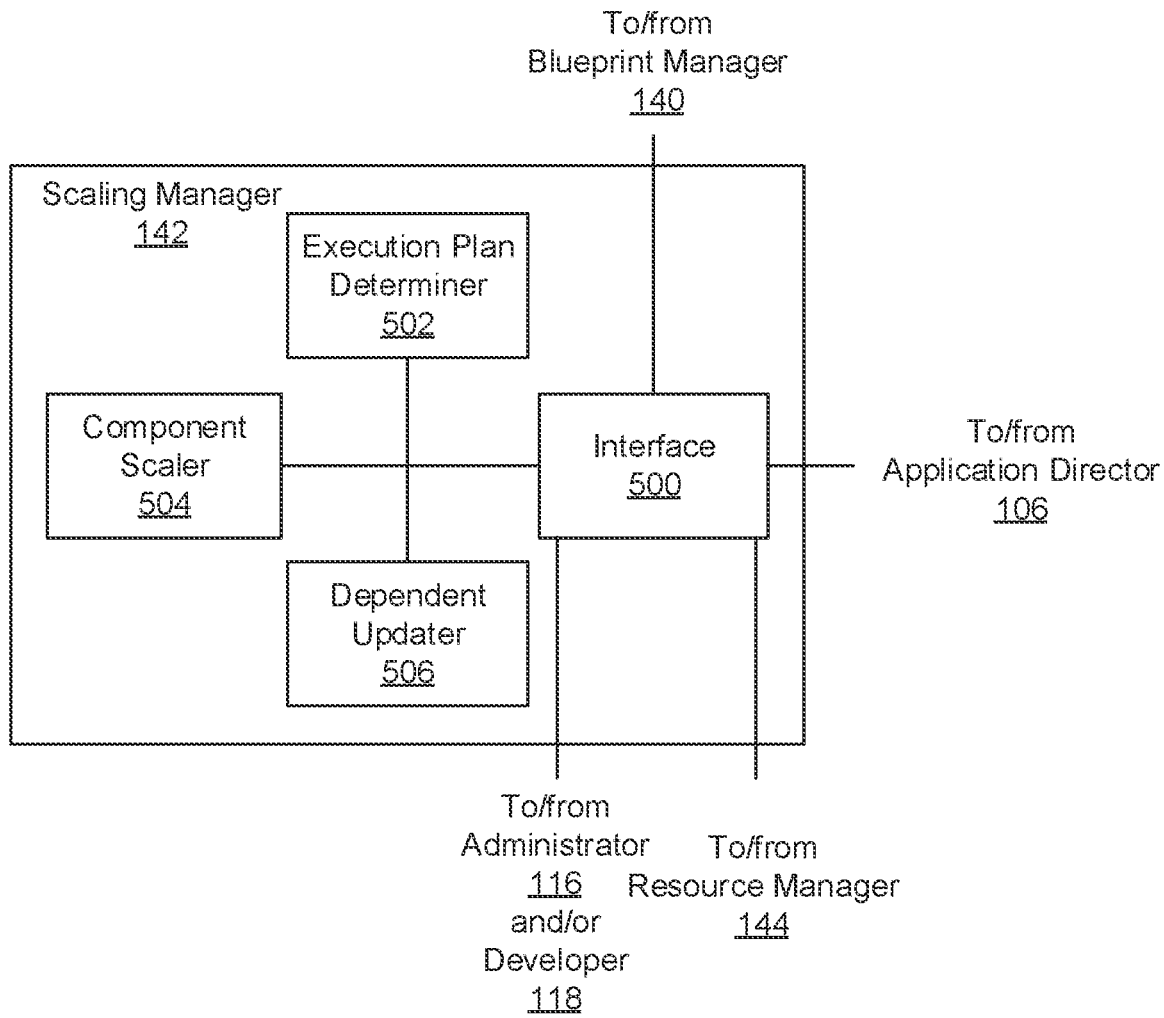
FIG. 5 illustrates a block diagram of the example scaling manager of FIG. 1.

FIG. 5 is a block diagram of the example scaling manager 142 of FIG. 1 to facilitate scale in and/or scale out of resources in the example cloud provider 110. The example scaling manager 142 includes an example interface 500, an example execution plan determiner 502, an example component scaler 504, and an example dependent updater 506.

The example interface 500 of FIG. 5 communicates with the application director 106, the administrator 116, the developer 118, and/or other devices. For example, the interface 500 receives instructions from the administrator 116, the developer 118, and/or other device to scale in and/or scale out an resource(s). The instructions include which components in the example cloud provider 110 are scalable, the custom actions for scaling the scalable component/resources, the custom update component operations for resources and/or components that depend on the scalable components (e.g., the load balancer 310, the example management endpoints 340-344, the example management agents 350-356, and/or any other component or resource that depends on a scalable component), and/or when to initiate a scale-in and/or scale out (e.g., scale in parameters and/or scale out parameters). Additionally, the interface 500 transmits instructions to the example application director 106 to update the components of the example cloud provider 110 based on the instructions to scale resources from the example administrator 116, developer 118, and/or any other device.

The example execution plan determiner 502 of FIG. 5 determines an execution plan based on the instructions to scale in and/or scale out resources. The execution plan determiner 502 determines the execution plan by calculating a dependency graph corresponding to the dependency within the blueprints. The dependency graph allows the execution plan determiner 502 to execute the scale in and/or scale out of resources in an efficient manner.

The example component scaler 504 of FIG. 5 scales the scalable components according to the scaling instructions from the administrator 116, the developer 118, and/or any other device. The component scaler 504 identifies which components and/or resources of the example cloud provider platform 110 are scalable. As described above, a designer may assign an application component as scalable and select the parameters related to the scalability of the component. The component scaler 504 scales the scalable components based on custom actions identified in the parameters (e.g., generated by the designer). For example, a blueprint can include a configuration to onboard a new hire. The example blueprint may involve creation of a new machine (e.g., the VM 112, the container 114a, and/or the vA 320, 322, 324) and a new user in a directory that is managed by the blueprint manager 140. After the blueprint manager 140 manages deployment of the blueprint to instantiate and configure one or more virtual machines and/or containers, etc., in the deployment environment 112, the resource manager 142 may determine that the load of the deployment environment 112 is high and/or the available resources to accommodate the load are low (e.g., based on scaling parameters generated by the designer and maintained by the scaling manager 142, etc.). In such an example, the resource manager 142 transmits instructions identifying the load and/or available resources. The component scaler 504 determines which components/resources in the cloud environment 112 are scalable and/or which scalable components/resources would positively affect the load (e.g., decreasing the amount of resources used with a low load and/or increasing the amount of resources used with a high load, etc.). For example, if a load corresponding to storage resources is high causing available storage to be low, the component scaler 504 may determine that scaling out the database server 460 of FIG. 4 into to two or more database servers may be necessary to handle the high load. Accordingly, the component scalar 504 instructs the blueprint manager 140 to apply a custom action to the database server to scale out the database server 460 into two or more database servers.

The example dependent updater 506 of FIG. 5 updates the dependent resource/component and/or configuration task(s) of the dependent resource/component corresponding to the scaled components. For example, if the virtual appliances 320, 322, 324 are scaled in to the virtual appliance 320, the load balancer 310 needs to be updated/reconfigured to control the scaled in virtual appliance 320 because the load balancer 310 assigns tasks and manages access to the virtual appliances 320,322,324. Accordingly, the example dependent updater 506 reconfigures and/or updates the load balancer 310 so that the load balancer 310 can operate under the new scaled in configuration. In some examples, the dependent updater 506 transmits the update/reconfigure instructions to the blueprint manager 140 to update the load balancer 310. In another example, the database server 460 may be scaled out into multiple database servers. In such an example, the proxy 450 may need to be updated and/or reconfigured to forward communication traffic to the scaled out database server 460 (now database servers). An example custom action to update a dependent resource/component and/or configuration task may be to update an Internet protocol (IP) table corresponding to the dependent resource. For example, the IP table may include data and/or instructions corresponding to the scalable component/resource. In such an example, when the scalable component/resource is scaled, the IP table corresponding to the dependent component is updated (e.g., via a call on a corresponding API on the dependent component/resource, for example) to reflected the scaling.

Figure 6:
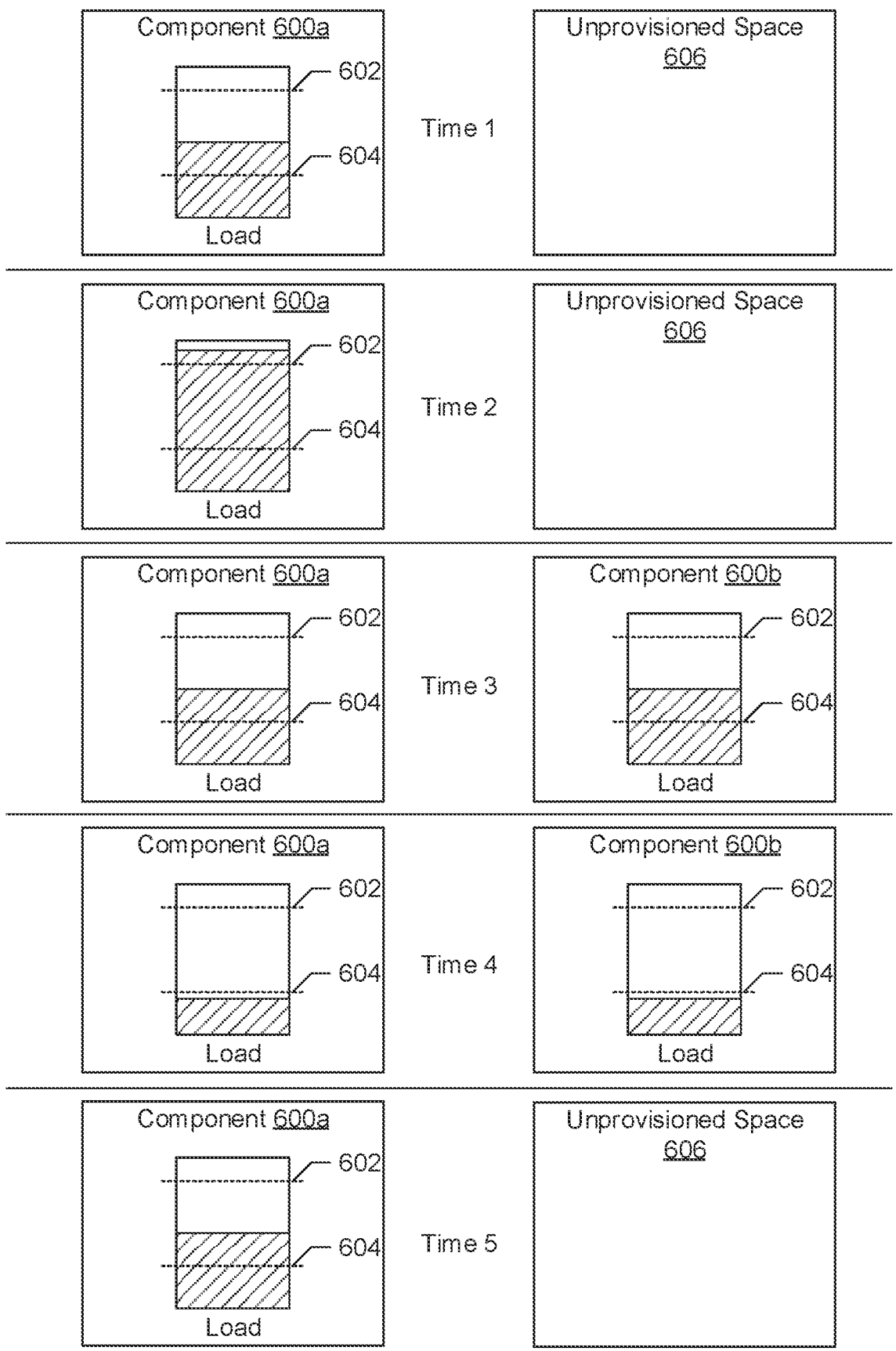
FIG. 6 illustrates an example of a scale in and scale out operation of a component of an example application of FIG. 1.

FIG. 6 illustrates an example scale in and scale out operation of an example scalable component 600a. The example of FIG. 6 includes the example scalable component 600a, an example scaled out component 600b, an example maximum load threshold 602, an example minimum load threshold 604, and an example unprovisioned space 606 at time 1 to time 5. The example scalable component 600a may be, for example, the VM 114, the container 114a, the vAs 320-324, the server, 210A-210C of FIG. 2, the component server 330-336 of FIG. 3, the service provider 410, the orchestrator 420, the event broker 430, the authentication provider 440, the database server 460 of FIG. 4, a business logic component, an analytical logic component, etc. The unprovisioned space 606 is any space available in the application 102 and/or the cloud provider platform 110 that is not currently being used and identified by the scaling parameters. The example thresholds 602, 604 correspond to a threshold amount of load determined by a designer or other device. The load of the example components 602a, 602b are determined by the example resource manager 144 of FIG. 1. At time 1, the load of the scalable component 600a is below the maximum load threshold 602 and above the minimum load threshold 604. Accordingly, based on the designer parameters (e.g., the threshold 602, 604 values), the example scaling manager 142 does not trigger a scaling operation. At time 2, the load of the scalable component 600a is above the maximum load threshold 602. Accordingly, the resource manager 144 transmits instructions to initiate a scale out operation of the example scalable component 600a. To initiate the scale out operation, the example execution plan determiner 502 executes a plan for the scale out, including where to scale out the component 600a into a second component. Additionally, at time 2, the component scaler 504 generates an additional component (e.g., the scaled out component 600b) in the unprovisioned space 606 (e.g., provisioning the unprovisioned space 606 for the scaled out component 600b, etc.). Further, the dependent updater 506 updates any resource that depends on the scalable component 600a (e.g., a load balancer, a proxy, a component manager, and/or any other device that interacts with, communicates with, and/or manages the scalable component 102a) so that the dependent component can continue interfacing with the scalable component 600a and the scaled out component 600b after scaling out.

At time 3, the unprovisioned space 600b has been provisioned to the scaled out component 600b, thereby causing the load to be split between the scalable component 600a and the scaled out component 600b. Accordingly, the scalable component 600a is not at risk of being overloaded. If the load of either one of the components 600a, 600b increases above the maximum threshold 602, an additional scaling out of the scalable component 600a may occur. At time 4, the load of the components 600a, 600b is below the minimum threshold 604; accordingly, the example resource manager 144 transmits instructions to initiate a scale in operation of the example scaled in component 600b. To initiate the scale in operation, the example execution plan determiner 502 executes a plan for the scale in. Additionally at time 4, the component scaler 504 removes an additional component (e.g., the scaled out component 600b) in the provisioned space (e.g., to un provision the space back to the unprovisioned space 606). Further, the dependent updater 506 updates any resource that depends on the scalable component 600a (e.g., a load balancer, a proxy, a component manager, and/or any other device that interacts with, communicates with, and/or manages the scalable component 102a) so that the dependent component can continue interfacing with the scalable component 600a after scaling in of the scaled out component 600b. At time 5, the load of the example scalable component 600a returns to a stable level (e.g., a load between the maximum threshold 602 and the minimum threshold 604).

Figure 7:
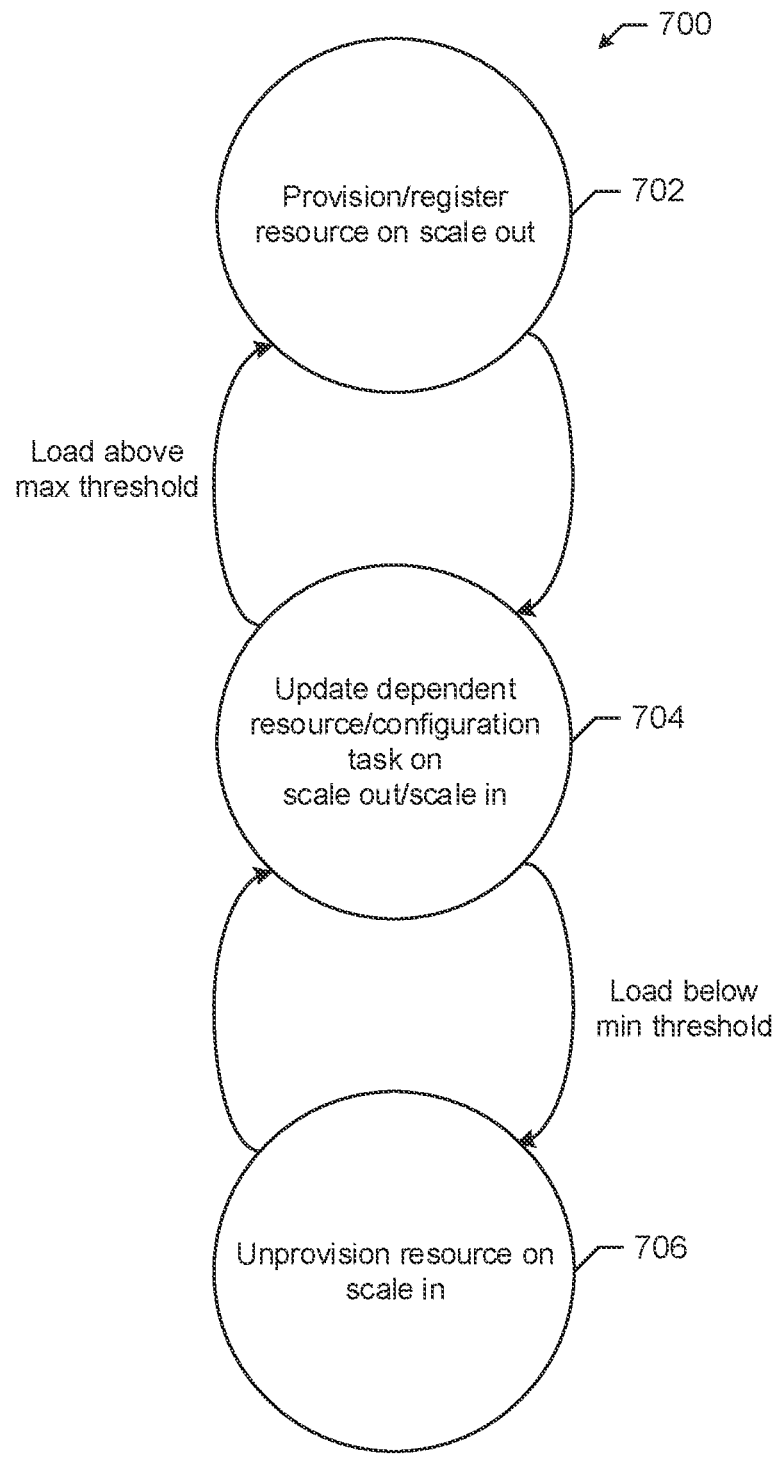
FIG. 7 illustrates an example state diagram illustrating transitions between different states before and/or after deployment of an example application.

FIG. 7 illustrates an example state diagram 700 illustrating transitions between different states (e.g., corresponding to a scale in operation and/or a scale out operation) before and/or after deployment of the example application 102, 102a. The example state diagram 700 include an example first state 702, an example second state 704, and an example third state 706.

The example first state 702 of FIG. 7 is a provision/register resource on a scale out operation. The first state 702 relates to provisioning and/or registering unprovisioned space within the application 102, 102a and/or the deployment environment 112 for scaled out components. As described above in conjunction with FIG. 1, the designer may select or otherwise reserve unprovisioned space in preparation for a scale out operation. The example second state 704 corresponds to updating dependent resource/configuration task(s) on scale out/scale in. As described above, dependent components are components that operate in conjunction with scalable components. For example, dependent components may communicate with, interface with, manage, monitor, and/or otherwise interact with scalable components. Accordingly, when a component is scaled out or scaled in, the dependent components are updated to continue to operate in conjunction with the scalable component(s) after the scaling. The example third state 704 corresponds to unprovisioning a resource (e.g., space in the cloud environment, etc.) on a scale in. As described above, the designer may define which scalable components will be scaled in during a scaled in operation (e.g., how to unprovision the resources corresponding to the scaled in components, etc.).

After deployment, when the load corresponding to a scalable component goes above a maximum load threshold and/or when the available resources corresponding to a scalable component goes below a minimum resource threshold, the process transitions to the first state 702 to provision/register resources for a scale out operation (e.g., by performing custom actions corresponding to designer preferences/instructions, etc.). Once the scale out is complete, the process transitions to the second state 704 to update dependent resource/configuration task for the scale out operation. As described above, the update may include updating an IP table of the dependent resource and/or updating configuration to facilitate operation in conjunction with the scaled out components.

When the load corresponding to a scalable component goes below a minimum load threshold and/or when the available resources corresponding to a scalable component goes above a maximum resource threshold, the process transitions to the third state 706 to unprovisioned resources for a scale in operation (e.g., corresponding to designer preferences/instructions, etc.). Once the scale in is complete, the process transitions to the second state 704 to update dependent resource/configuration task for the scale in operation. As described above, the update may include updating an IP table of the dependent resource, updating configuration to facilitate operation in conjunction with the scaled in components, and/or performing cleanup logic.

While an example manner of implementing the example scaling manager 142 of FIG. 1 is illustrated in FIG. 5, one or more of the elements, processes and/or devices illustrated in FIG. 5 may be combined, divided, re-arranged, omitted, eliminated and/or implemented in any other way. Further, the example interface 500, the example execution plan determiner 502, the example component scaler 504, the example dependent updater 506, and/or, more generally, the example scaling manager 142 of FIGS. 1 and/or 5 may be implemented by hardware, software, firmware and/or any combination of hardware, software and/or firmware. Thus, for example, any of the example interface 500, the example execution plan determiner 502, the example component scaler 504, the example dependent updater 506, and/or, more generally, the example scaling manager 142 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, interface 500, the example execution plan determiner 502, the example component scaler 504, and/or the example dependent updater 506 is/are hereby expressly defined to include a non-transitory computer readable storage device or storage disk such as a memory, a digital versatile disk (DVD), a compact disk (CD), a Blu-ray disk, etc. including the software and/or firmware. Further still, the example scaling manager 140 of FIG. 1 may include one or more elements, processes and/or devices in addition to, or instead of, those illustrated in FIG. 5, and/or may include more than one of any or all of the illustrated elements, processes and devices.

Figure 8:
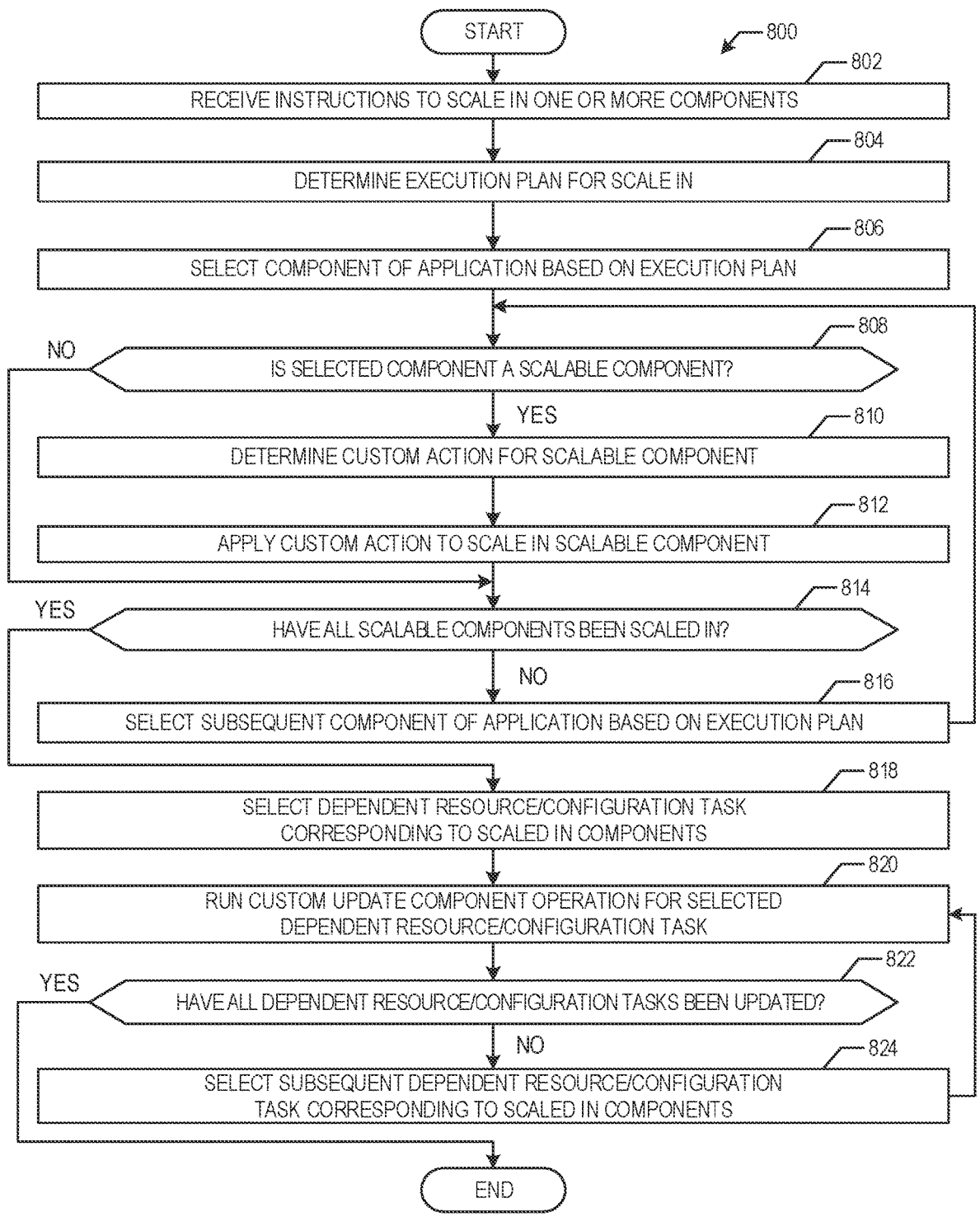
FIGS. 8-9 depict flowcharts representative of computer readable instructions that may be executed to implement example infrastructure installation.
Figure 9:
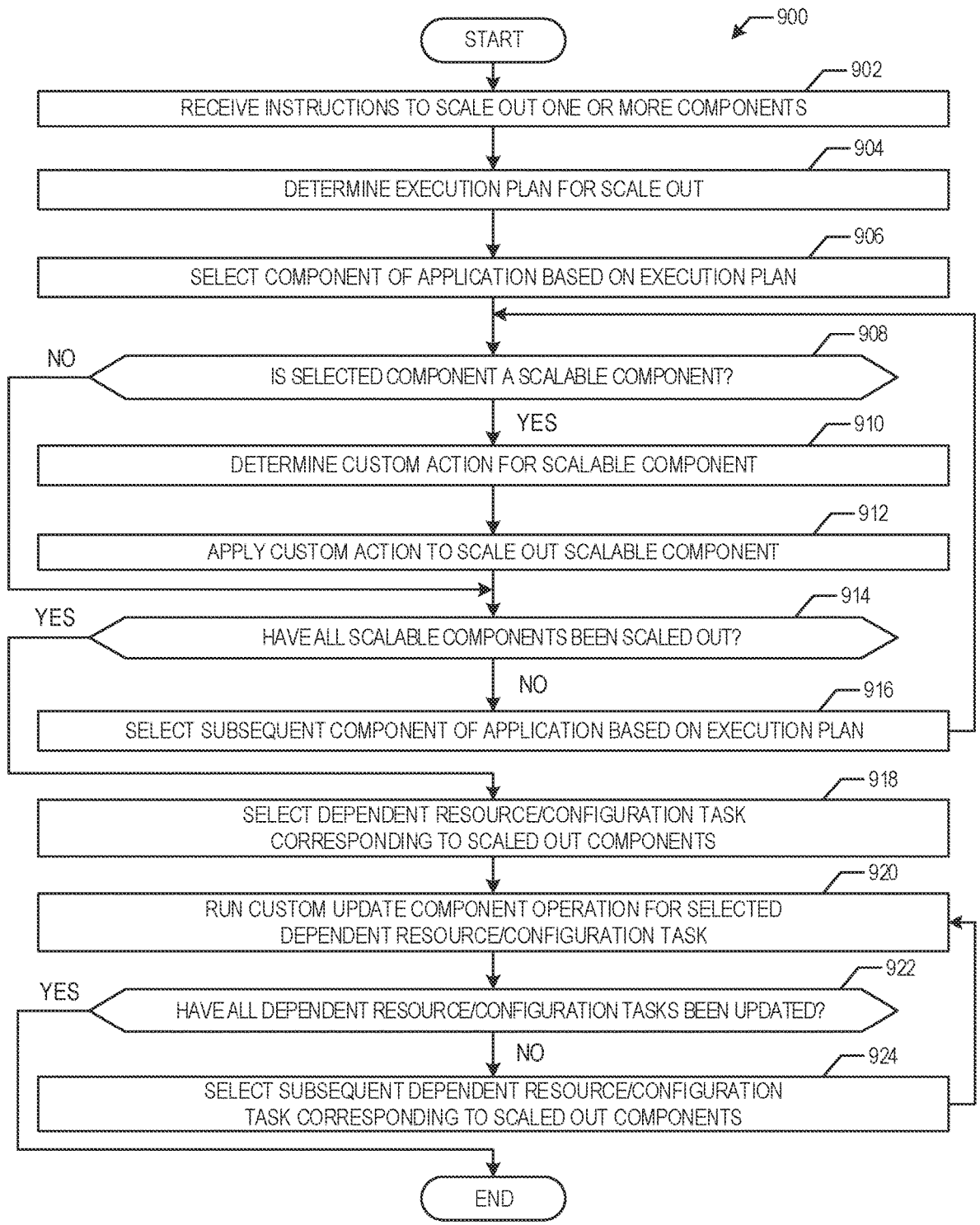

A flowchart representative of example machine readable instructions for implementing the scaling manager 142 of FIG. 1 is shown in FIGS. 8-9. In this example, the machine readable instructions comprise a program for execution by a processor such as the processor 1012 shown in the example processor platform 1000 discussed below in connection with FIG. 10. The program may be embodied in software stored on a non-transitory computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 8-9, many other methods of implementing the example scaling manager 142 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 8-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 8 depicts an example flowchart 800 representative of computer readable instructions that may be executed to implement the scaling manager 142 of FIG. 5 to scale in components of the application 102, 102a. Although the instructions of FIG. 8 are described in conjunction with the scaling manager 142 of FIG. 1, the example instructions may be utilized by any type of cloud and/or virtual system manager. The scale in operation of FIG. 8 may occur at any time, including after the application 102, 102a has been deployed and configured, thereby corresponding to real-time resource allocation based on the load of a scalable component.

Initially, at block 802, the interface 500 receives instructions to scale in one or more components (e.g., the VMs 114, the containers 114a, the vAs 320-324, the servers, 210A-210C, the component servers 330-336, the service provider 410, the orchestrator 420, the event broker 430, the authentication provider 440, the database server 460, etc.) in the application 102, 102a FIG. 1. The instructions may be a trigger/request/message from a device that corresponds to a scale in parameter being met (e.g., generated by a designer). For example, a designer may generate scaling parameters corresponding to the scaling-in of various components of the application 102, 102a in the deployment environment 112.

The designer may identify a load and/or resource availability threshold as a parameter for triggering a scale in operation to conserve resources that do not need to be utilized by the deployment environment 112 to operate efficiently. In such an example, the scale in operation reduces the additional resources into fewer resources to conserve resource usage (e.g., using resources that correspond to the load). For example, if the load on a multiple scaled out virtual machines are low (e.g., below some threshold load), a device may transmit a trigger to initiate scale in, thereby reducing the multiple virtual machines into a smaller number of virtual machines to conserve resources. At block 804, the execution plan determiner 502 determines an execution plan for the scale in of the one or more components. As described above in conjunction with FIG. 5, the execution plan determiner 502 may determine the execution plan for scale in based on a generated dependency graph. At block 806, the component scaler 504 selects a component of the application(s) 102, 102a based on the execution plan.

At block 808, the component scaler 504 determines if the selected component is a scalable component. As described above, a component (e.g., the VMs 114, the containers 114a, the vAs 320-324, the servers, 210A-210C, the component servers 330-336, the service provider 410, the orchestrator 420, the event broker 430, the authentication provider 440, the database server 460, etc.) may be scalable when a designer marks the component as scalable and defines parameters (e.g., when to scale, how to scale, where to scale, etc.) corresponding to the scaling of the component, to reserve additional resources when a load is high (e.g., for better workload efficiency, etc.) and to conserve resources when the load is low. For example, a designer may determine that the virtual appliances 320, 322 of FIG. 3 are scalable and the virtual appliance 324 is not scalable. In such an example, the virtual appliance 320 would be tagged or otherwise marked as scalable and would include parameters corresponding to a scale in operation, including the location of unprovisioned space for the additional resources (e.g., for scaling out), a load and/or resource threshold to trigger a scaling, custom instructions corresponding to how to scale the component and how to update a dependent component, etc. If the component scaler 504 determines that the selected component is not a scalable component (block 808: NO), the process continues to block 814. If the component scaler 504 determines that the selected component is a scalable component (block 808: YES), the component scaler 504 determines a custom action for the scalable component based on the scale in parameters corresponding to the scalable component (e.g., generated by the designer) (block 810). At block 812, the component scaler 504 applies the custom action to scale in the scalable component(s). Such a custom action may include which provisioned storage corresponding to scalable components to unprovision. As described above in conjunction with FIG. 1, the unprovisioning of scaled out components for scale in operation may be based on designer instructions and/or preferences.

At block 814, the component scaler 504 determines if all scalable components have been scaled in. For example, if the instructions to scale in include a scale in operation of multiple components, the component scaler 504 scales the components according to the instructions. If the component scaler 504 determines that all of the scalable components have not been scaled in (block 814: NO), the component scaler 504 select a subsequent component of the application 102, 102a based on the execution plan (block 816) and the process returns to block 808.

If the component scaler 504 determines that all of the scalable components have been scaled in (block 814: YES), the dependent updater 506 selects a dependent resource/configuration task corresponding to the scaled in component(s) (block 818). As described above, a dependent resource/configuration task is an item that depends (e.g., operates in conjunction with) a scalable component. For example, dependent resources/configuration tasks include, but are not limited to, the manager(s) 144, 146A, 146B, the load balancer 310, the management endpoints 340-344, the management agents 350-356, the proxy 450, etc. Because operation of a dependent resource/configuration task can be affected by a scale in of one or more components, the component scaler 504 selects such dependent resource/configuration tasks for an update, thereby allowing the dependent resource/configuration tasks to properly function with the scaled in component.

At block 820, the component scaler 504 runs a custom update component operation for the selected dependent resource/configuration task to update the dependent resource/configuration task for operation with the scaled in component. For example, a custom update component operation may include updating the IP table of the dependent component to operation in conjunction with the scaled-in components and/or performing some cleanup logic. At block 822, the component scaler 504 determines if all dependent resource/configuration tasks have been updated. If the component scaler 504 determines that all of the dependent resources/configuration tasks have not been updated (block 822: NO), the component scaler 504 selects a subsequent dependent resource/configuration task corresponding to the scaled in component(s) (block 824) and the process returns to block 820. If the component scaler 504 determines that all of the dependent resources/configuration tasks have been updated (block 822: YES), the process ends.

FIG. 9 depicts an example flowchart 900 representative of computer readable instructions that may be executed to implement the scaling manager 142 of FIG. 5 to scale out an components of the application 102, 102a. Although the instructions of FIG. 9 are described in conjunction with the scaling manager 142 of FIG. 1, the example instructions may be utilized by any type of cloud and/or virtual system manager. The scale out operation of FIG. 9 may occur at any time, including after the application 102, 102a has been deployed and configured, thereby corresponding to real-time resource allocation based on the load of a scalable component.

Initially, at block 902, the interface 500 receives instructions to scale out one or more components in the application 102, 102a of FIG. 1. The instructions may be a trigger/request/message from a device that corresponds to a scale out parameter being met (e.g., generated by a designer). For example, a designer may generate scaling parameters corresponding to the scaling out of various components of the application 102, 102a in the deployment environment 112. The designer may identify a load and/or resource availability threshold as a parameter for triggering a scale out operation to deploy additional resources to balance the load of the scalable component. For example, if the load on a particular virtual machine is high (e.g., above some threshold load, etc.), a device may trigger to initiate scale out, thereby generating two or more additional virtual machines to share the load of the scalable virtual machine, thereby preventing an overload of the scalable virtual machine. At block 904, the execution plan determiner 502 determines an execution plan for the scale out of the one or more components. As described above in conjunction with FIG. 5, the execution plan determiner 502 may determine the execution plan for scale out based on a generated dependency graph. At block 906, the component scaler 504 selects a component of the application(s) 102, 102a based on the execution plan.

At block 908, the component scaler 504 determines if the selected component is a scalable component. As described above, a component (e.g., the VMs 114, the containers 114a, the vAs 320-324, the servers, 210A-210C, the component servers 330-336, the service provider 410, the orchestrator 420, the event broker 430, the authentication provider 440, the database server 460, etc.) may be scalable when a designer marks the component as scalable and defines parameters (e.g., when to scale, how to scale, where to scale, etc.) corresponding to the scaling of the component to reserve additional resources when a load is high (e.g., for better workload efficiency, etc.) and to conserve resources when the load is low. For example, a designer may determine that the virtual appliances 320, 322 of FIG. 3 are scalable and the virtual appliance 324 is not scalable. In such an example, the virtual appliance 320 would be tagged or otherwise marked as scalable and would include parameters corresponding to a scale out operation, including the location of the unprovisioned space for the additional resources (e.g., for scaling out), a load and/or resource threshold to trigger a scaling, custom instructions corresponding to how to scale the component and how to update a dependent component, etc. If the component scaler 504 determines that the selected component is not a scalable component (block 908: NO), the process continues to block 914. If the component scaler 504 determines that the selected component is a scalable component (block 908: YES), the component scaler 504 determines a custom action for the scalable component based on the scale out parameters corresponding to the scalable component (e.g., generated by the designer) (block 910). At block 912, the component scaler 504 applies the custom action to scale out the scalable component(s). Such a custom action may include provisioning unprovisioned storage for the scalable component. As described above in conjunction with FIG. 1, the space to provision/register for a scale out operation may be based on designer instructions and/or preferences.

At block 914, the component scaler 504 determines if all scalable components have been scaled out. For example, if the instructions to scale out include a scale out operation of multiple components, the component scaler 504 scales the components according to the instructions. If the component scaler 504 determines that all of the scalable components have not been scaled out (block 914: NO), the component scaler 504 select a subsequent component of the application 102, 102a based on the execution plan (block 916) and the process returns to block 908.

If the component scaler 504 determines that all of the scalable components have been scaled out (block 914: YES), the dependent updater 506 selects a dependent resource/configuration task corresponding to the scaled out component(s) (block 918). As described above, a dependent resource/configuration task is an item that depends (e.g., operates in conjunction with) a scalable component. For example, dependent resources/configuration tasks include, but are not limited to, the manager(s) 144, 146A, 146B, the load balancer 310, the management endpoints 340-344, the management agents 350-356, the proxy 450, etc. Because operation of a dependent resource/configuration task can be affected by a scale out of one or more components, the component scaler 504 selects such dependent resource/configuration tasks for an update, thereby allowing the dependent resource/configuration tasks to properly function with the scaled in component.

At block 920, the component scaler 504 runs a custom update component operation for the selected dependent resource/configuration task to update the dependent resource/configuration task for operation with the scaled in component. Such a customer update component operation may include updating the configurations to operate in conjunction with the scalable component and the scaled out components. At block 922, the component scaler 504 determines if all dependent resource/configuration tasks have been updated. If the component scaler 504 determines that all of the dependent resources/configuration tasks have not been updated (block 922: NO), the component scaler 504 selects a subsequent dependent resource/configuration task corresponding to the scaled out component(s) (block 924) and the process returns to block 920. If the component scaler 504 determines that all of the dependent resources/configuration tasks have been updated (block 922: YES), the process ends.

Using the techniques illustrated in FIGS. 8-9, cloud resources can be scaled out (e.g., expanded in additional resources) and/or scaled in (e.g., contracted into fewer resources) based on the current state (e.g., load and resource availability) of the cloud provider platform 110. Accordingly, resources can be conserved when the load is low and additional resources can help the system with the load is high, thereby generating a highly efficient deployment environment 112. The scaling manager 142 provides an interface for a designer to determine which component(s) in the application 102, 102a may be scalable as well as various parameters corresponding to the scaling of the components (e.g., how to scale, when to scale, what to scale, etc.). Accordingly, when a scaling operation is triggered (e.g., based on a threshold associated with a high/low load and/or high/low resource availability, etc.), the scaling manager 142 scales the component(s), providing an adaptive application 102 that reacts to changes in load and/or resource availability to provide a more efficient application 102. Because such scalable components may correspond to dependent components (e.g., components that communicate, interact, and/or manage the scalable components), the techniques illustrated in FIGS. 8-9 further include updating the dependent components/resources/configuration tasks to adapt to the scaling out of one component into multiple components and/or the scaling in of multiple components into fewer components to allow the dependent components to continue to communicate, interact, and/or manage the scaled components without error. Using the techniques illustrated in FIGS. 8-9, resources are conserved when the load is low and additional resources are made available when the load is high.

Thus, the scaling manager 142 can scale in/out applications deployed in a public and/or private cloud to meet a requested load. For example, the scaling manager 142 can scale out to provision new instance(s) of a VM 114, container 114a, vA 320, component server 330, etc. Conversely, the scaling manager 142 can scale in to release unneeded computing resource(s) when load is low. In an example, a plurality of VMs 114 serve business logic, and the load balancer 310 is used to dispatch requests among the business logic VMs 114. On scale out, one or more new VMs 114 are provisioned, and the load balancer 310 is updated by the scaling manager 142 to be able to dispatch requests to the newly provisioned VMs 114. On scale in, when a VM 114 is unprovisioned, the load balancer 310 is updated by the scaling manager 142 such that backends created from the unprovisioned VM 114 is deleted. In another example, an XaaS component may be a scalable component, where, when there is a demand (e.g., new XaaS components are request or decommissioned) corresponding to a trigger or signal to provide more network interfaces, new port groups are created/removed in a network switch to meet the request.

Figure 10:
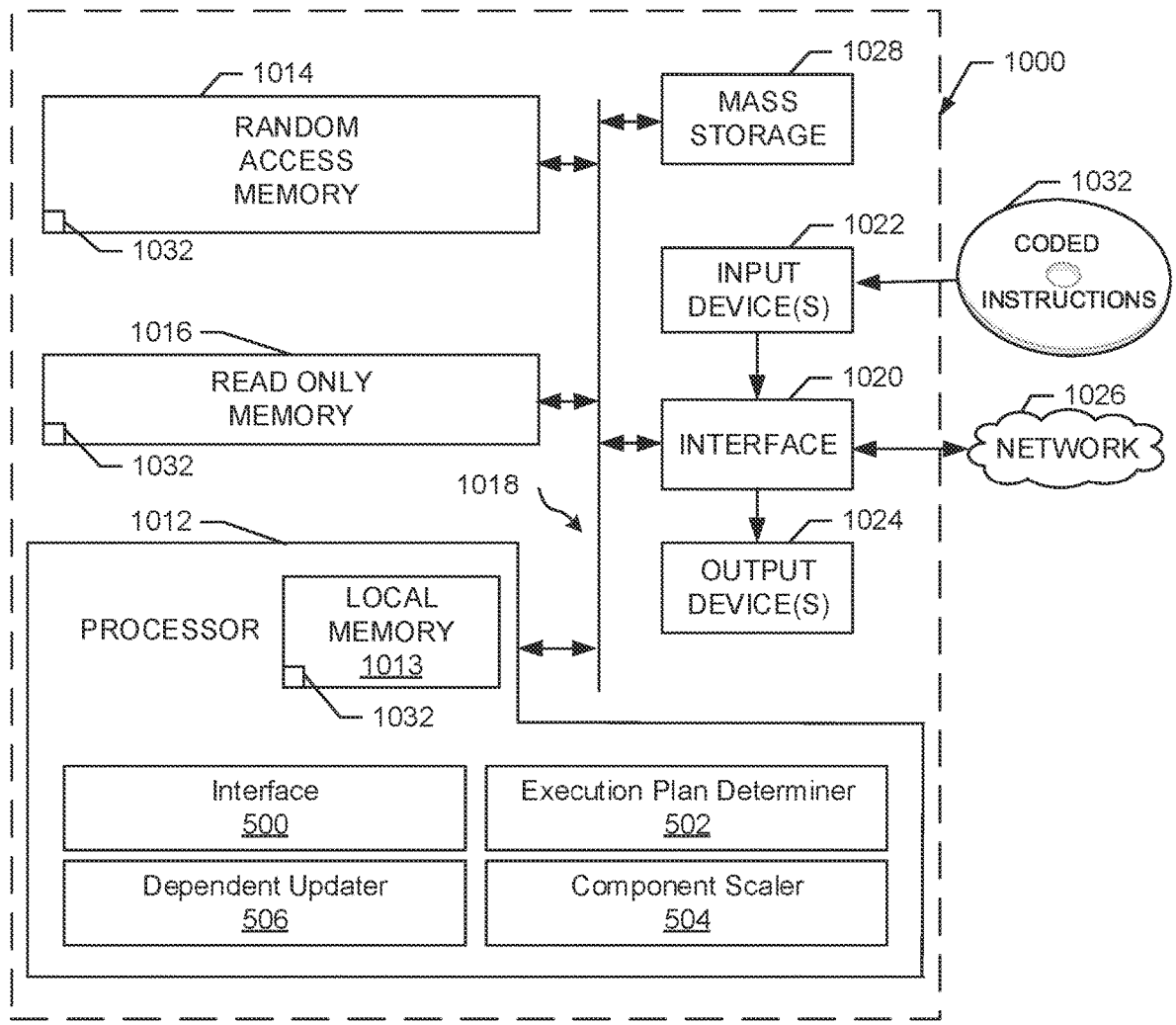
FIG. 10 is a block diagram of an example processing platform capable of executing the example machine-readable instructions of FIGS. 8-9.

FIG. 10 is a block diagram of an example processor platform 1000 capable of executing the instructions of FIGS. 8-9 to implement the example systems, operation, and management of FIGS. 1-7. The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache), and executes instructions to implement the example systems 100, 300 or portions thereof, such as the interface 500, the execution plan determiner 502, the example dependent updater 506, the component scaler 504. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include flash devices, floppy disk drives, hard drive disks, optical compact disk (CD) drives, optical Blu-ray disk drives, RAID systems, and optical digital versatile disk (DVD) drives.

Coded instructions 1032 representative of the example machine readable instructions of FIGS. 8-9 may be stored in the mass storage device 1028, in the volatile memory 1014, in the non-volatile memory 1816, and/or on a removable tangible computer readable storage medium such as a CD or DVD.

From the foregoing, it will be appreciated that the above disclosed methods, apparatus and articles of manufacture scale in and/or scale out resources managed by a cloud automation system. Examples disclosed herein include providing an interface for a designer to design application components to be scalable (e.g., scale out to generate additional resources to share the load of a component when a load is high and/or scale in to remove additional resources with the load is low, etc.) based on one or more parameters (e.g., identifying a threshold load and/or resource availability level to trigger a scale in and/or scale out operation, etc.). When the one or more parameters are met (e.g., when the load increases above a first threshold level and/or decreases below a second threshold level), examples disclosed herein scale in or scale out the application components based on the designer's preferences. For example, a designer may design a cloud platform application that includes one virtual machine that the designer defines as scalable. When the load on the virtual machine rises above the threshold level, examples disclosed herein may scale out the virtual machine into two virtual machines to balance the load between the two machines. Examples disclosed herein further include updating a load balancer based on the two virtual machines and the management of the load between the two virtual machines. Put in another way, because the scalable components may be in communication with other dependent components/resources/configuration tasks, examples disclosed herein include updating the dependent components/resources/configuration tasks to operate after a scaling of the scalable components. Using examples disclosed herein, a designer can design a cloud environment that is more robust and less affected by changes in load, because examples disclosed herein adapt to the changes in load. By scaling in and/or scaling out components, resources can be conserved when not needed and used when needed, thereby providing an efficient and adaptive cloud environment that is able to adapt after a blueprint has been deployed based on varying load conditions. Examples disclosed herein provide a more customizable and adaptable cloud environment for users and/or customers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    interface circuitry;
    instructions; and
    processor circuitry to execute the instructions to:
        in response to an indication to scale a plurality of components of an application to be deployed:
            determine an execution plan to scale the plurality of components based on a dependency graph corresponding to a first order of the plurality of components within a blueprint specifying a logical topology of the application, the first order being associated with an installation order of the plurality of components;
            perform a custom action to scale the plurality of components in a second order, the custom action identified in a scaling parameter associated with the application, the second order being determined based on the first order; and
            update operation of a dependent component based on scaling the plurality of components, the dependent component dependent on the plurality of components, the update to enable the dependent component to interact with the plurality of component after the scaling.

2. The apparatus of claim 1, wherein the indication is a first indication and the processor circuitry is to perform the custom action in response to a second indication including the scaling parameter received after the application has been deployed.

3. The apparatus of claim 2, wherein the scaling parameter identifies a threshold level of load on the plurality of components above which to scale out the plurality of components.

4. The apparatus of claim 2, wherein the scaling parameter identifies a threshold level of load on a first component of the plurality of components and a third component of the plurality of components provisioned during a previous scaling of the first component of the plurality of components below which to scale in the third component of the plurality of components.

5. The apparatus of claim 1, wherein the custom action corresponds to unprovisioning one of the first component or a third component of the plurality of components provisioned during a previous scaling of the first component of the plurality of components.

6. The apparatus of claim 1, wherein the custom action corresponds to provisioning the second component of the plurality of components in previously unprovisioned space available in the application.

7. The apparatus of claim 6, wherein the scaling parameter includes a location indicating where in the previously unprovisioned space to provision the second component of the plurality of components during a scale out operation.

8. A non-transitory computer readable storage medium comprising instructions which, when executed, cause a machine to at least:
    in response to an indication to scale a plurality of components of an application to be deployed:
        determine an execution plan to scale the plurality of components based on a dependency graph corresponding to a first order of the plurality of components within a blueprint specifying a logical topology of the application, the first order being associated with an installation order of the plurality of components;
        perform a custom action to scale the plurality of components in a second order, the custom action identified in a scaling parameter associated with the application, the second order being determined based on the first order; and
        update operation of a dependent component based on scaling the plurality of components, the dependent component dependent on the plurality of components, the update to enable the dependent component to interact with the plurality of components after the scaling.

9. The non-transitory computer readable storage medium of claim 8, wherein the indication is a first indication and the instructions, when executed, cause the machine to perform the custom action in response to a second indication including the scaling parameter received after the application has been deployed.

10. The non-transitory computer readable storage medium of claim 9, wherein the scaling parameter identifies a threshold level of load on the plurality of components above which to scale out the plurality of components.

11. The non-transitory computer readable storage medium of claim 9, wherein the scaling parameter identifies a threshold level of load on a first component of the plurality of components and a third component of the plurality of components provisioned during a previous scaling of the first component of the plurality of components below which to scale in the third component of the plurality of components.

12. The non-transitory computer readable storage medium of claim 8, wherein the custom action corresponds to unprovisioning one of a first component or a third component of the plurality of components provisioned during a previous scaling of the first component of the plurality of components.

13. The non-transitory computer readable storage medium of claim 8, wherein the custom action corresponds to provisioning a second component of the plurality of components in previously unprovisioned space available in the application.

14. The non-transitory computer readable storage medium of claim 13, wherein the scaling parameter includes a location indicating where in the previously unprovisioned space to provision the second component of the plurality of components during a scale out operation.

15. A method comprising:
in response to an indication to scale a plurality of components of an application to be deployed:
determining, by executing an instruction with processor circuitry, an execution plan to scale the plurality of components based on a dependency graph corresponding to a first order of the plurality of components within a blueprint specifying a logical topology of the application, the first order being associated with an installation order of the plurality of components;
performing, by executing an instruction with the processor circuitry, a custom action to scale the plurality of components in a second order, the custom action identified in a scaling parameter associated with the application, the second order being determined based on the first order; and
updating, by executing an instruction with the processor circuitry, operation of a dependent component based on scaling the plurality of components, the dependent component dependent on the plurality of components, the update to enable the second component to interact with the plurality of components after the scaling.

16. The method of claim 15, wherein the indication is a first indication and the method further includes performing the custom action in response to a second indication including the scaling parameter received after the application has been deployed.

17. The method of claim 16, wherein the scaling parameter identifies a threshold level of load on the plurality of components above which to scale out the plurality of components.

18. The method of claim 16, wherein the scaling parameter identifies a threshold level of load on a first component of the plurality of components and a third component of the plurality of components provisioned during a previous scaling of the first component of the plurality of components below which to scale in the third component of the plurality of components.

19. The method of claim 15, wherein the custom action corresponds to unprovisioning one of a first component or a third component of the plurality of components provisioned during a previous scaling of the first component of the plurality of components.

20. The method of claim 15, wherein the custom action corresponds to provisioning a second component of the plurality of components in previously unprovisioned space available in the application.

* * * * *